United States Patent [19]

Mechel et al.

[11] 4,337,075
[45] Jun. 29, 1982

[54] TWIN CENTER COOLING FIN FOR TIP TYPE BUSHING

[75] Inventors: John R. Mechel, Maumee; Eric J. Brosch, Grand Rapids, both of Ohio

[73] Assignee: Manville Service Corporation, Denver, Colo.

[21] Appl. No.: 274,945

[22] Filed: Jun. 18, 1981

[51] Int. Cl.³ ............................................ C03B 37/025
[52] U.S. Cl. ...................................... 65/12; 65/10.1; 65/348
[58] Field of Search .......................... 65/12, 348, 10.1

[56] References Cited

U.S. PATENT DOCUMENTS 3,746,525  7/1973  Kasuga et al. ........................... 65/12
3,997,309 12/1976  Harris ..................................... 65/12

FOREIGN PATENT DOCUMENTS 1079099 8/1967 United Kingdom ................... 65/12

Primary Examiner—Robert L. Lindsay, Jr.
Attorney, Agent, or Firm—Robert M. Krone; Joseph J. Kelly; Richard K. Thomson

[57] ABSTRACT

An oval cooling tube for the central portion of a fiberizing bushing having a plurality of parallel cooling fins attached to the sides thereof.

2 Claims, 2 Drawing Figures

TWIN CENTER COOLING FIN FOR TIP TYPE BUSHING

TECHNICAL FIELD

The present invention relates to a cooling tube supported beneath the orifice tip plate of a bushing used to make fibers from a molten material, such as glass.

BACKGROUND OF THE INVENTION

A well known method for making fibers from a molten material such as glass is described and illustrated in U.S. Pat. No. 3,997,309. Although the cooling tubes in the patent are illustrated as being round, it is known to make the tubes in different shapes, such as oval, and to mount a cooling fin on the top of the tube. The fin is located closest to the orifice tip plate. As bushings became larger, it became necessary to fabricate the bushing in two halves and weld them together along a longitudinal center line. This resulted in added problems in the function of the center cooling tubes.

SUMMARY OF THE INVENTION

The present invention provides a cooling tube for beneath the orifice tip plate of a bushing wherein the cooling tube is provided with spaced apart parallel cooling fins.

DESCRIPTION OF THE INVENTION

Figure 1:
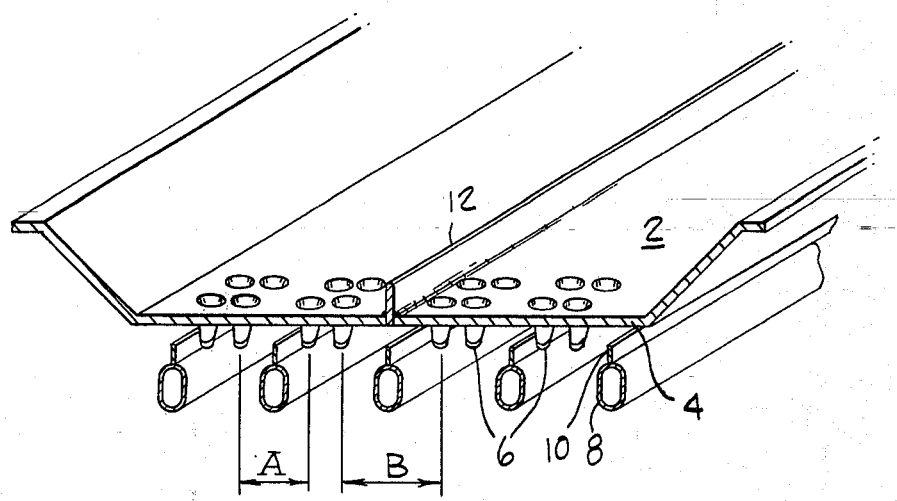
FIG. 1 is a view of the prior art illustrating oval cooling tubes with a fin on the top of each tube.

In FIG. 1, there is illustrated part of a conventional bushing for holding molten material from which fibers are formed. The bushing 2 has an orifice tip plate 4 having a plurality of orifice tips 6. Supported beneath the orifice tip plate 4 are a plurality of cooling tubes 8. Each cooling tube is oval in shape and has a longitudinally extending fin 10 secured to the top of the tube. The bushing 2 is formed in two halves which are secured together by a central longitudinal weld 12. The addition of the weld 12 makes the distance B between the two central rows of orifice tips greater than the normal distance A between rows of orifice tips.

Figure 2:
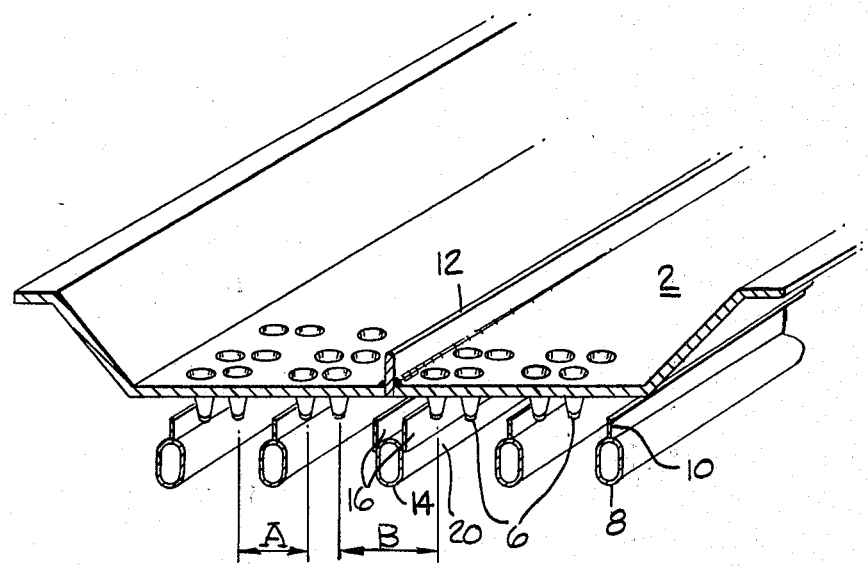
FIG. 2 is a view illustrating the cooling tube of this invention.

In FIG. 2, there is illustrated the cooling tube of this invention. The central cooling tube 14 has a cooling fin 16 secured to each side 18 and 20. This locates the cooling fins 16 closer to the central rows of orifice tips so that better cooling performance may be obtained. Although the cooling tube 14 has been provided with two cooling fins it was not necessary to change the shape or size of the cooling tube.

What we claim is:

1. In a bushing for holding molten material from which fibers are formed wherein the bottom of the bushing is formed by an orifice tip plate having a plurality of rows of orifice tips and a plurality of oval shaped cooling tubes supported beneath said bushing and extending parallel to the rows of orifice tips and wherein each cooling tube is provided with a longitudinally extending cooling fin secured to the top thereof, the improvement comprising:
   (a) a cooling tube extending along a longitudinal center line of said bushing; and
   (b) a plurality of parallel longitudinally extending cooling fins, one of said cooling fins secured to each side of the top of said cooling tube.

2. Apparatus as in claim 1 and further comprising: said cooling tube is oval in cross-section so as to have top, bottom and two side portions.

* * * * *